United States Patent
Kurukchi et al.

(10) Patent No.: US 11,248,182 B1
(45) Date of Patent: Feb. 15, 2022

(54) REDUCTION OF SOX AND NOX EMISSIONS FROM RENEWABLE DIESEL PLANTS

(71) Applicant: Janus Technology Solutions, LLC, Spring, TX (US)

(72) Inventors: Sabah A. Kurukchi, Houston, TX (US); Joseph M. Gondolfe, Magnolia, TX (US)

(73) Assignee: Janus Technology Solutions, LLC, Spring, TX (US)

(*) Notice: Subject to any disclaimer, the term of this patent is extended or adjusted under 35 U.S.C. 154(b) by 0 days.

(21) Appl. No.: 17/407,536

(22) Filed: Aug. 20, 2021

Related U.S. Application Data (60) Provisional application No. 63/072,404, filed on Aug. 31, 2020.

(51) Int. Cl.
| | |
|---|---|
| *C10G 67/14* | (2006.01) |
| *C02F 1/20* | (2006.01) |
| *C10G 3/00* | (2006.01) |
| *C02F 1/469* | (2006.01) |
| *C02F 101/16* | (2006.01) |

(Continued)

(52) U.S. Cl.
CPC ............ *C10G 67/14* (2013.01); *C02F 1/20* (2013.01); *C02F 1/4693* (2013.01); *C10G 3/50* (2013.01); *C02F 2101/101* (2013.01); *C02F 2101/16* (2013.01); *C02F 2103/365* (2013.01);

(Continued)

(58) Field of Classification Search
CPC .... C10G 3/50; C10G 67/14; C10G 2300/202; C10G 2300/207; C10G 2300/1011; C02F 1/20; C02F 1/4693; C02F 2101/16; C02F 2101/101; C02F 2103/365
See application file for complete search history.

(56) References Cited

U.S. PATENT DOCUMENTS

2015/0353841 A1* 12/2015 Rispoli .................... C10G 3/42
585/310

OTHER PUBLICATIONS

Jou, F. et al. (1982) Industrial & Engineering Chemistry Process Design and Development, 21(4), 539-544.*

(Continued)

*Primary Examiner* — Brian A McCaig
(74) *Attorney, Agent, or Firm* — C. Tumey Law Group PLLC (57) ABSTRACT

A method may include: introducing triglycerides, hydrogen, and a sulfiding agent into a hydroprocessing reactor; reacting the triglycerides with the hydrogen in the hydroprocessing reactor to form at least paraffins; separating at least a portion of a hydroprocessing reactor effluent from the hydroprocessing reactor in a first phase separator to produce a first sour water stream comprising water and a first quantity of hydrogen sulfide and a paraffin stream comprising at least a portion of the paraffins; introducing the first sour water stream into a sour water stripper and stripping the first sour water stream to form a gaseous stream comprising at least a portion of the first quantity of the hydrogen sulfide from the first sour water stream; and contacting the gaseous stream with an acidified wash water in an ammonia removal unit to produce an aqueous ammonia solution stream and a treated gaseous hydrogen sulfide stream; and introducing the treated hydrogen sulfide stream into the hydroprocessing reactor. The aqueous ammonia solution stream is neutralized with an acid to form an ammonium salt solution product.

20 Claims, 5 Drawing Sheets

(51) Int. Cl.
*C02F 103/36* (2006.01)
*C02F 101/10* (2006.01)
(52) U.S. Cl.
CPC ............... *C10G 2300/1011* (2013.01); *C10G 2300/202* (2013.01); *C10G 2300/207* (2013.01)

(56) References Cited

OTHER PUBLICATIONS

Lu, J-G et al. (2006) Separation and Purification Technology, 52, 209-217.*

* cited by examiner

REDUCTION OF SOX AND NOX EMISSIONS FROM RENEWABLE DIESEL PLANTS

BACKGROUND

Renewable diesel is a mixture of highly-paraffinic hydrocarbons whose boiling point range is directly compatible with traditional refinery-based diesel. Renewable diesel may be produced via a catalyzed reaction of triglycerides. The renewable diesel production process may include hydroprocessing and/or decarboxylation/decarbonylation of triglycerides from various agricultural biomass and animal fats feedstocks such as soy, corn, poultry fat, tallow, and pork fat. The composition of oil and fats are mainly triglycerides with a smaller fraction of organic compounds, some of which may be chemically bound with phosphorous, sulfur, and/or nitrogen, as well as trace metals. Biomass-derived feedstocks contain oxygenated compounds that lower the chemical stability and energy content of the renewable diesel. Therefore, the oxygen must be removed from the feedstock to achieve a liquid fuel with a high thermal stability and combustion properties similar to that of traditional refinery diesel fuels. The process whereby oxygen is removed from the feedstock is called deoxygenation which may include hydrodeoxygenation, decarboxylation, and decarbonylation.

Hydroprocessing is a general term used for the catalytic reactions that use hydrogen to eliminate heteroatoms such as sulfur, nitrogen, oxygen, and metals from the feedstock. Hydroprocessing also saturates olefinic bonds in triglycerides in the feedstock and breaks the triglyceride into corresponding oleaginous compounds which may be further refined into the product renewable diesel. Some hydroprocessing operations include hydrodesulfurization (HDS) where the sulfur is removed by breaking C—S bonds forming hydrogen sulfide as a gaseous product, hydrodenitrogenation (HDN) which targets the removal of nitrogen as ammonia, hydrodeoxygenation (HDO) which removes oxygen as water, and hydrodemetalization (HDM) to remove metals such as metal sulfides. Renewable diesel production processes may include an HDO step to remove oxygen from the triglycerides which may also convert the triglycerides to renewable diesel. Each of the hydroprocessing operations may occur within the same reactor which may include several catalyst beds with varying partial pressures of $H_2$. The particular reactions which are favored in each bed may be determined by the reactor conditions at any particular bed. Continuous sulfiding of the hydroprocessing catalyst in each bed is necessary to control the hydroprocessing reaction and control coke formation. The effluent from a hydroprocessing unit containing the converted triglycerides may be cooled and separated into a sour water stream, oleaginous stream, and gaseous stream.

The continuous sulfiding presents operational challenges as sulfur compounds contaminate process streams downstream of the hydroprocessing unit. The sour water stream captures a majority of the sulfur compounds as well as ammonia which then must be stream stripped to produce an ammonia and hydrogen sulfide gas mixture. The gas mixture is typically considered as a waste product of the process and is burned in a flare which contributes to nitrogen oxides (NOx) and sulfur oxides (SOx) emissions of the renewable diesel process.

BRIEF DESCRIPTION OF THE DRAWINGS

These drawings illustrate certain aspects of some of the embodiments of the present invention and should not be used to limit or define the invention.

DETAILED DESCRIPTION

Disclosed herein are systems and methods which relate to treatment of a sour water stream in a renewable diesel plant. In particular, the systems and methods may separate components of the sour water stream to form a recycle sulfiding stream and an ammonium sulfate stream. The systems and methods disclosed herein advantageously reduce the sulfur oxide (SOx) and nitrogen oxide (NOx) emission from the renewable diesel plant by recapturing and recycling components which would normally be burned to flare and contribute to environmental emissions.

Figure 5:
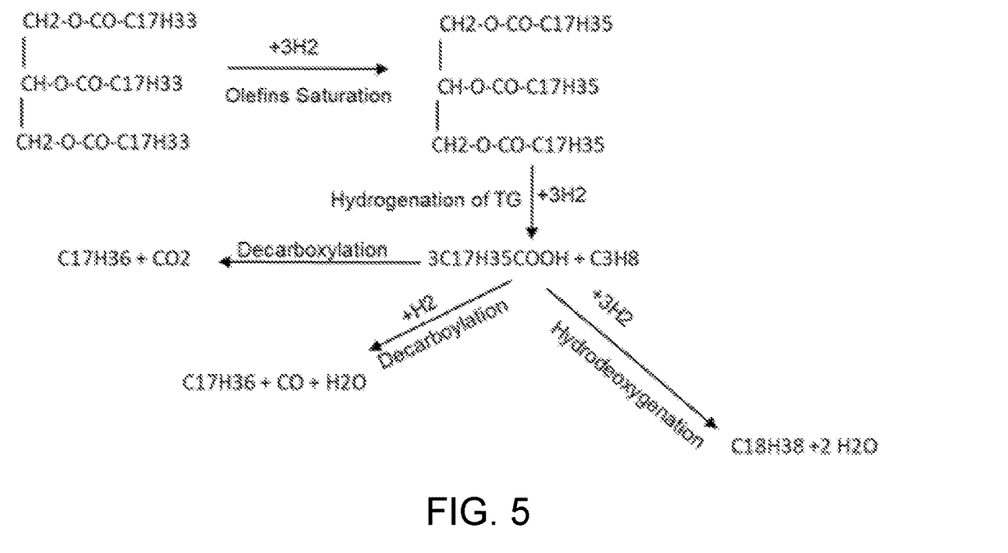
FIG. 5 is a flow diagram of a hydrocracking reaction pathway.
Figure 6:
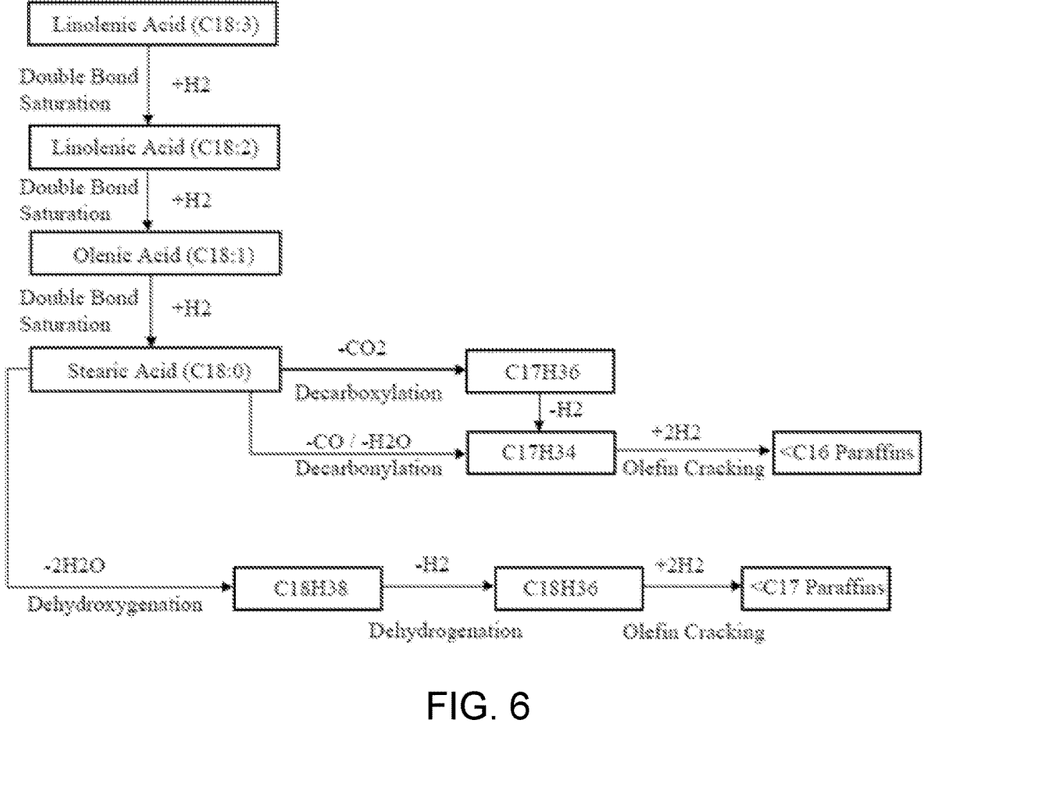
FIG. 6 is a flow diagram of a hydrocracking reaction pathway.

Renewable diesel may be produced by hydrotreating a feed stream comprising triglycerides in a hydroprocessing unit to produce the renewable diesel. Renewable diesel may include hydrocarbons with 12-20 carbon atoms with a boiling range between about 170° C. and 360° C. The hydroprocessing unit may include several hydroprocessing steps such as HDS, HDN, HDM, HDO, olefin saturation, and olefin cracking as discussed above. An example hydroprocessing reaction of C18:1 TG (triglyceride) is shown in FIG. 5. The products of the hydroprocessing reaction may include heptadecane and octadecane. FIG. 6 shows a reaction pathway of hydroprocessing of C18:3 free fatty acid (FFA). The products of Reaction 2 are <C16 paraffins and <C17 paraffins.

The hydroprocessing unit may produce a renewable diesel effluent comprising hydrocarbons with 12-20 carbon atoms with a boiling range between about 170° C. and 360° C., where the composition and physical properties of the renewable diesel effluent may vary depending on feed composition, catalyst, H2 partial pressure in each catalyst bed, and operating conditions for example. A hydroprocessing reactor in the hydroprocessing unit may be operated at any suitable temperature and pressure, however, the reaction conditions may be adjusted depending on the feed conditions to the hydroprocessing reactor. For example, the hydroprocessing reactor may operate at a temperature between about 675° F.-725° F. (357° C.-385° C.) and a total pressure of about 650-700 psig (4.48 MPa-4.82 MPa). The partial pressure of hydrogen in the rector is preferably kept high to promote the desired reactions. The catalysts used for HDO may the same as those that are used for HDS and HDN. Some suitable catalysts for the hydroprocessing reactions described herein may include sulfided homogeneous catalysts such as, without limitation, Co—Mo or Ni—Mo, which may be similar to hydrogenation catalysts used in petroleum refineries. Some catalysts may be used which promote further reaction of certain species in the reactor such as carbon dioxide illustrated in Reaction 3 and Reaction 4 below.

Methanation Reaction: $CO_2 + 4H_2 \rightarrow CH_4 + 2H_2O$     Reaction 3

Reverse Water Gas Shift Reaction: $CO_2 + H_2 \leftrightarrow CO + H_2O$     Reaction 4

A sulfiding agent may be continuously added to the hydroprocessing reactor or an isomerization reactor to renew the sulfide content of the catalyst. The catalytic activity of hydroprocessing catalysts such as Co—Mo and Ni—Mo catalysts may be too high at operating conditions in the hydroprocessing reactor which may lead to operational issues and coking. Sulfiding agent may be added to the hydroprocessing reactor or isomerization reactor to control catalytic activity which may reduce coking reactions by passivating the catalyst and may reduce runaway hydrogenation reactions. The sulfiding agent may be hydrogen sulfide or a sulfur-containing compound which decomposes to hydrogen sulfide in the hydroprocessing reactor and/or isomerization reactor. Some suitable sulfur-containing compounds include methyl sulfides such as dimethyl sulfide (DMS) or dimethyl disulfide (DMDS), mercaptans and polysulfides.

The feed to the hydroprocessing reactor may include C12-C20 triglycerides, hydrogen, and a sulfiding agent. Each of C12-C20 triglycerides, hydrogen, and a sulfiding agent may be introduced separately or combined in any manner. The triglycerides which may be sourced from renewable sources such as plant and animal sources. Hydroprocessing of vegetable oil and animal fats may yield deoxygenated straight chain paraffins such as hydrocarbons with 12-20 carbon atoms with a boiling range between about 170° C. and 360° C., water, and gaseous byproducts including methane ($CH_4$), ethane ($C_2H_6$), propane ($C_3H_8$), butane ($C_4H_{10}$), carbon dioxide ($CO_2$), carbon monoxide (CO), and hydrogen sulfide ($H_2S$) in varying degrees depending on the feedstock composition. The hydrogen may be from any source including a steam methane reformation (SMR) unit. In steam methane reformation, hydrogen gas is produced by reaction of methane with steam to produce carbon oxides and hydrogen. SMR may be particularly advantageous in geographic areas where hydrogen is not readily available such as agricultural regions. Although both hydrogenation and decarboxylation successfully produce deoxygenated straight chain paraffins which may be classified as renewable diesel, there may be pros and cons for both decarboxylation and hydrodeoxygenation. Decarboxylation may require hydrogen only to saturate olefins and produce $CO_2$ and may result in mass loss of renewable diesel product. Hydrodeoxygenation uses hydrogen not only to saturate olefins but also to remove oxygen as water. Thus, hydrogen consumption is higher for the hydrodeoxygenation reaction but produces reduced $CO_2$ as compared to decarboxylation. The $CO_2$ produced may be removed using an acid gas removal system such as an amine unit.

The first reaction in the hydroprocessing reactor may be hydrogenation of triglycerides to remove saturated bonds. The second reaction may involve removal of oxygen atoms which can be hydrodeoxygenation, decarboxylation and/or decarbonylation. Additionally, side reactions taking place such as the hydrocracking of triglycerides, water—gas shift reaction, methanization, and cyclization may occur. Oxygen containing groups in triglycerides may be eliminated by reacting with hydrogen gas to produce corresponding hydrocarbons from the triglyceride feed. To promote the hydrogenation reactions, the hydrogenation reactions may be carried out in an excess hydrogen atmosphere to avoid side reactions such as polymerization, ketonization, and cyclization. Insufficient hydrogen gas partial pressure may result in coke formation on the catalyst surface and catalyst deactivation. As a result, the renewable diesel yield decreases and the profile of renewable diesel species changes. Renewable diesel composition may be altered by controlling hydrogen gas pressure in the hydroprocessing reactor.

Hydrogen is consumed as a reactant in all the reactions above and to promote the reactions that yield greater amounts of renewable diesel product, there must be sufficient hydrogen in the reactor feed to part in the catalytic reaction. Past processes have operated at high pressures in order to achieve a desired amount of hydrogen in solution and readily available for reaction. If hydrogen is not available at the reaction site of the catalyst, coke forms on the catalyst and deactivates the catalyst. To solve this problem, the hydrogen partial pressure is often raised to ensure enough hydrogen is solubilized in the liquid feed to avoid coking reactions on the catalyst. However, higher pressure operations are more costly to design/construct and operate as compared to their lower pressure alternatives.

As an alternative to high hydrogen partial pressure, hydrogen may be kept in solution at lower pressures by employing a large recycle of hydrocarbon. The range of recycle to feedstock ratios which may be utilized may be based on the need to control the level of hydrogen in the liquid phase to control catalyst deactivation rate. Providing relatively larger amounts of hydrogen may also disperse heat in the reactor by directly quenching reactants and products. However, temperature control requirements may not be the primary factor in determining recycle ratio, but instead the recycle ratio may be based upon hydrogen solubility requirements. Hydrogen has a greater solubility in the hydrocarbon product than it does in the feedstock triglyceride. By utilizing a large hydrocarbon recycle the solubility of hydrogen in the liquid phase in the reaction zone may be greatly increased and therefore higher hydrogen partial pressure may not be needed to increase the amount of hydrogen in solution. This approach may avoid catalyst deactivation through coking at low hydrogen partial pressures. In some embodiments, the volume ratio of hydrocarbon recycle to feedstock may range from about 2:1 to about 8:1. In another embodiment, the ratio may range from about 3:1 to about 6:1 and in yet another embodiment the ratio may range from about 4:1 to about 5:1. The specific ranges of vol/vol ratios of recycle to feed may be determined based on achieving a suitable hydrogen solubility in the deoxygenation reaction zone of the hydroprocessing reactor.

Reactor effluents from the hydroprocessing reactor may include a liquid portion and a gaseous portion. The gaseous portion may include hydrogen, carbon dioxide, carbon monoxide, water vapor, propane and as well as sulfur components such as hydrogen sulfide and phosphorous compounds such as phosphine if phosphorous is present in the reactor feed. The gaseous portion may include hydrogen and carbon dioxide from the decarboxylation reaction. The carbon dioxide may be separated from the hydrogen by absorption with an amine solution, for example. If desired, essentially pure carbon dioxide may be recovered by regenerating the spent absorption media. The hydrogen remaining after the removal of the carbon dioxide may be recycled to the hydroprocessing reactor. Water may also be removed from the hydrogenation and deoxygenation zone effluent and sent to a sour water stripper (SWS).

The liquid portion of the hydroprocessing reactor effluent, after its water content is removed, comprises a hydrocarbon fraction which is essentially all straight chain paraffins. Feedstock variations to hydro-processing result in different distributions of these paraffins. A portion of this hydrocarbon fraction, after separation, may be used as the hydrocarbon recycle back to the hydroprocessing reactor for direct quenching of the reaction exotherm. Although this hydrocarbon fraction may be useful as a diesel fuel as it comprises essentially all n-paraffins, the produced fuel may have undesirable properties such as poor cold flow and high freeze point.

The net liquid from the hydroprocessing reactor may be further processed to have desirable properties. For example, the hydrocarbons may be contacted with an isomerization catalyst in a hydro-isomerization (HDI) reactor. The HDI reactor may isomerize at least a portion of the hydrocarbons from n-paraffins to multi-branched paraffins to improve the cold flow properties. The HDI catalysts may be zeolitic-based, and they may either selectively isomerize or crack the normal paraffins. The isomerization catalysts and operating conditions may be selected so that the isomerization catalyst also catalyzes selective hydrocracking of the paraffins. The effluent of the HDI Reactor after isomerization and selective hydrocracking of the hydrocarbon feed results in the formation of a branched-paraffin-enriched stream. The term "enriched" means that the effluent stream has a greater concentration of branched paraffins than the stream entering the HDI reactor. The branched-paraffin-enriched stream may include any fraction of branched paraffins. In some embodiments, the branched-paraffin-enriched stream may include 50 wt. % or greater branched paraffins. In another embodiment, the branched-paraffin-enriched stream may include 70 wt. % or greater, 80 wt. % or greater, or 90 wt. % or greater branched paraffins. The isomerization and selective hydrocracking reactions may be carried out in separate beds of the same reactor, described above, or the isomerization and selective hydrocracking may be carried out in separate reactors. For ease of description, the following will address the embodiment where a second reactor is employed for the isomerization and selective hydrocracking reactions.

In the renewable diesel unit, water is formed in the hydroprocessing reactor from the hydrodeoxygenation reaction. In some embodiments, a wash water may be added to the hydroprocessing reactor effluent to wash out water-soluble trace components from the liquid n-paraffins. The mixed water reactor effluents may pass to a three-phase separator where the gas is routed to an amine absorber to remove the CO2, the raw renewable diesel may be sent to steam stripper and the aqueous phase including water, dissolved CO2, H2S and NH3 is directed to the sour water stripper. Sour water may also be separated from a stripper reflux drum situated before the HDI reactor and sour water may also be separated from the hydro-isomerization reactor effluent by cooling the effluent and separating a sour water stream from separator downstream of the HDI reactor. Both these sour water streams are directed to sour water stripper.

Any of the aforementioned sour water streams or other streams not specifically mentioned may be sent to the sour water stripper. In the sour water stripper, sour gases such as CO2, H2S and NH3 with water vapor are stripped out to the overhead stream using steam. The overhead stream containing the stripped gasses are normally send to thermal oxidation, such as by flaring, which generate SOx and NOx byproducts. However, as will be discussed in further detail below, the overhead stream from the sour water stripper can be recycled and reused to from useful products.

A sour gas recovery system disclosed herein may be utilized to separate and reuse a portion of the overhead stream from the sour water stripper. The sour gas recovery system advantageously reduces the sulfur oxide (SOx) and nitrogen oxide (NOx) emission from the renewable diesel plant by recapturing and recycling components which would normally be burned to flare and contribute to environmental emissions.

There may be two primary streams containing sulfur compounds that enter the renewable diesel unit which are subsequently converted to H2S. The first stream is the triglyceride containing feed to the hydroprocessing reactor, and the second stream is the sulfiding agent, such as DMDS or equivalents, which may be added to a liquid stream entering the hydroprocessing reactor and/or the HDI reactor. There may be three primary streams which contain H2S which are generated in the renewable diesel unit. The first is the amine absorption unit bottoms which contains the rich amine, the second is the sour water stripper overhead stream, and the third is the sour water stripper bottoms.

There may be two primary streams containing nitrogen and nitrogen compounds that enter the renewable diesel unit. The first stream is the triglyceride containing feed to the hydroprocessing reactor where nitrogen is converted to NH3, and the second stream may be natural gas with some nitrogen content that may enter the steam methane reformer reactor and convert at least some of the nitrogen to NH3. There may be three primary streams which contain ammonia which leave the renewable diesel unit. The first is the amine absorption unit bottoms which contains the rich amine, the second is the sour water stripper overhead stream, and the third is the sour water stripper bottoms.

Figure 1:
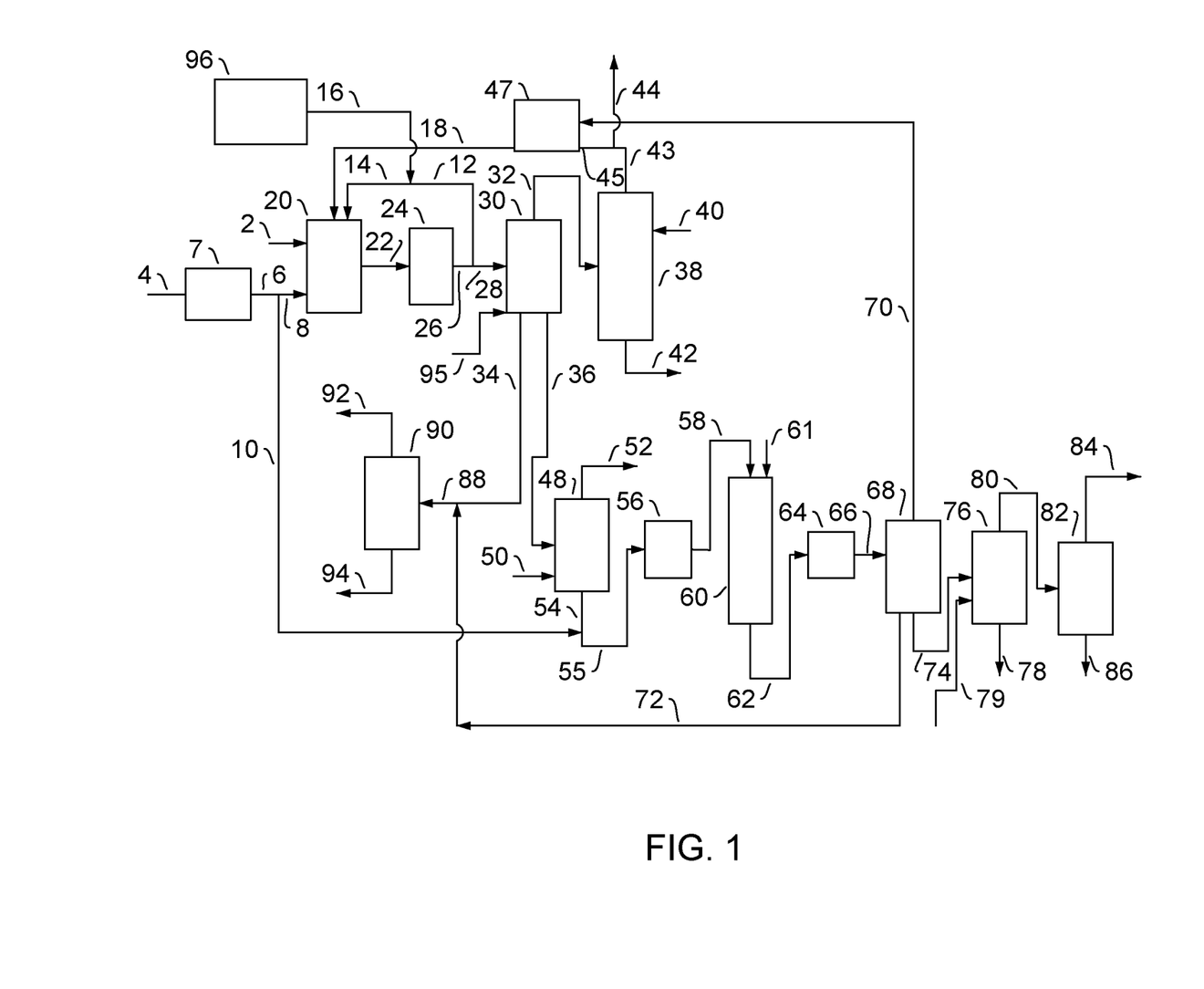
FIG. 1 is a block flow diagram of a renewable diesel plant with an amine unit.

FIG. 1 is a block flow diagram of a renewable diesel plant with an amine unit. As shown in FIG. 1, feedstock 2, hydrogen stream 8, recycle H2 stream 18, and quench liquid hydrocarbon stream 14 with added sulfiding agent stream 16 from the sulfiding agent package 96, are all fed to hydrotreater (HDT) reactor 20. Hydrotreater reactor 20 may include multiple catalyst beds to perform olefin saturation, demetalization, and deoxygenation reactions successively. Hydrotreater reactor 20 may be operated at any suitable pressure such as 675° F.-725° F. (357° C.-385° C.) and a total pressure of about 650-700 psig (4.48 MPa-4.82 MPa). Feedstock 2 may include C12-C20 triglycerides as discussed above which may be sourced from vegetable oil, animal fat, or a blend of both. Feedstock 2 may be pretreated to remove contaminants before introduction into the hydrotreater reactor 20. In hydrotreater reactor 20, the triglycerides may contact catalyst beds in the presence of H2 and undergo a series of reactions as outlined above. A product of the reaction may include deoxygenated straight chain paraffins such as hydrocarbons with 12-20 carbon atoms with a boiling range between about 170° C. and 360° C., water, and gaseous byproducts which may include methane (CH4), ethane (C2H6), propane (C3H8), butane (C4H10), carbon dioxide ($CO_2$), carbon monoxide (CO), hydrogen sulfide (H2S), and ammonia (NH3) in varying degrees depending on the composition of feedstock 2. Additional makeup hydrogen to the process may be provided by hydrogen stream 4 which may be introduced into makeup hydrogen compressor 7. Compressed hydrogen stream 6 may be withdrawn from makeup hydrogen compressor 7 and split to hydrogen stream 8 and hydrogen stream 10.

Effluent 22 containing the products from hydrotreater reactor 20 may be introduced into cooler 24 to reduce the temperature of effluent 22. Cooled effluent stream 26 may be split into quench liquid hydrocarbon stream 12 for re-introduction to hydrotreater reactor 20 and stream 28 which may be introduced into phase separator 30. Phase separator 30 may include any equipment which facilitates separation of phases including drums, coalescers, foam breakers, liquid/gas separators, and liquid/liquid separators, for example. Phase separator 30 may separate the components of stream 28 into stream 32 containing hydrogen, carbon oxides, H2S, and C3 and lighter hydrocarbons. Wash water stream 95 may be introduced into phase separator 30 to dissolve NH3 present in stream 28 as ammonia may contribute to amine absorber fouling. A portion of the H2S present in stream 28 may also be absorbed into the wash water provided by wash water stream 95. The sour water containing NH3 and H2S may be withdrawn from phase separator 30 and be introduced into sour water stripper 90. Liquid hydrocarbons may be withdrawn from phase separator 30 as stream 36 which may include paraffins generated in hydrotreating reactor 20 with dissolved H2, H2S, CO, and CO2.

Stream 32 from phase separator 30 may include a large quantity of hydrogen and carbon monoxide which may be used in a recycle gas stream. The carbon dioxide in stream 32 may be removed from the hydrogen and carbon monoxide in amine absorber 38 by contacting carbon dioxide from stream 32 with lean amine from stream 40. If desired, essentially pure carbon dioxide may be recovered by regenerating the rich amine solution stream 42 containing the dissolved CO2 in an amine regenerator. Scrubbed recycle gas 43 may include the C3 and lighter hydrocarbons, hydrogen, and carbon monoxide from stream 32 which may be split into two parts. Purge stream 44 may be used to prevent CO accumulation in hydrotreating reactor 20. Hydrogen purge stream 44 may be sent to a steam methane reformation unit to recover its H2 and hydrocarbon (C3−) content. Stream 45 may be introduced into recycle gas compressor 47 and be recycled to hydrotreating reactor 20 as recycle H2 stream 18.

Stream 36 may be introduced to steam stripper 48 to strip out the dissolved gases such as H2, H2S, CO, CO2, and C3 hydrocarbons using stripping steam 50. Hydrogen, H2S, carbon oxides, and C3-hydrocarbons may be separated and removed in stream 52 and sent to the fuel gas drum. The resultant stripped hydrocarbons may be withdrawn from steam stripper 48 as stripped hydrocarbon stream 54. Stripped hydrocarbon stream 54 may have poor cold flow properties because it comprises essentially normal paraffins derived from triglycerides. In order to improve the cold flow properties of the liquid hydrocarbon fraction, the liquid hydrocarbons in stripped hydrocarbon stream 54 may be mixed with hydrogen stream 10. Mixed stream 55 may be introduced into heater 56 to produce heated mixed stream 58 which may be introduced into isomerization reactor 60. Isomerization reactor 60 may include an isomerization catalyst and may be operated at conditions sufficient to at least partially isomerize a fraction of normal paraffins in stripped liquid hydrocarbon stream 54 to branched paraffins. Isomerization reactor 60 may operate at any suitable pressure including from about 625-675 psig (4.3 MPa-4.65 MPa) range and at any temperature including between 600° F. to 700° F. (315° C.-371° C.). In isomerization reactor 60, only minimal branching of the hydrocarbons is required to overcome cold-flow problems of the normal paraffins. Since attempting for significant branching runs the risk of high degree of undesired cracking, the predominant isomerized product may be targeted as a mono-branched hydrocarbon. The isomerization catalyst utilized in isomerization reaction 60 may require sulfiding to control reactivity which may be provided by sulfiding agent 61. Sulfiding agent 61 may be the same as sulfiding package 96 and/or may include H2S from treated gas stream 114.

An isomerized effluent 62 may be withdrawn from isomerization reactor 60 which contains the generated branched paraffins and unreacted normal paraffins from stripped liquid hydrocarbon stream 54. Isomerized effluent 62 may be cooled in cooler 64 to form cooled stream 66 which may be introduced to phase separator 68. Hydrogen, hydrogen sulfide and C3 hydrocarbons from cooled stream 66 may be separated in phase separator 68 and be withdrawn in stream 70. Liquid hydrocarbons from cooled stream 66 may be separated in phase separator 68 and the liquid hydrocarbons may be removed in stream 74. In some embodiments, a water wash stream may be introduced into phase separator 68 to absorb residual H2S from cooled stream 66. A sour water stream may be separated in phase separator 68 and be withdrawn as stream 72 which may be introduced into sour water stripper 90. The vapor in stream 70 from the phase separator 68 may include a large quantity of hydrogen so it may be used as a recycle gas stream by introducing stream 70 into recycle gas compressor 47.

The liquid hydrocarbons removed from phase separator 68 in stream 74 may include normal and isomerized paraffins with dissolved hydrogen and light cracked hydrocarbons including those with carbon numbers of C10 and below. Stream 74 may be introduced into steam stripper 76 to strip out the dissolved hydrogen and C10 and below hydrocarbons utilizing stripping steam 79. Hydrogen and the C10 and below hydrocarbons are separated and removed in stream 80, cooled, and sent to the naphtha stabilizer 82. The stripper bottom liquid stream 78 is the renewable diesel (RD) product which may contain hydrocarbons with 12-20 carbon atoms with a boiling range between about 170° C. and 360° C. Naphtha stabilizer 82 may include a refluxed distillation column with a reboiler. The overhead vent stream 84 from the reflux drum may include hydrogen and trace H2S which may be sent to the fuel gas drum. The bottoms stream of the naphtha stabilizer 84 is the renewable naphtha product stream 86.

Figure 2:
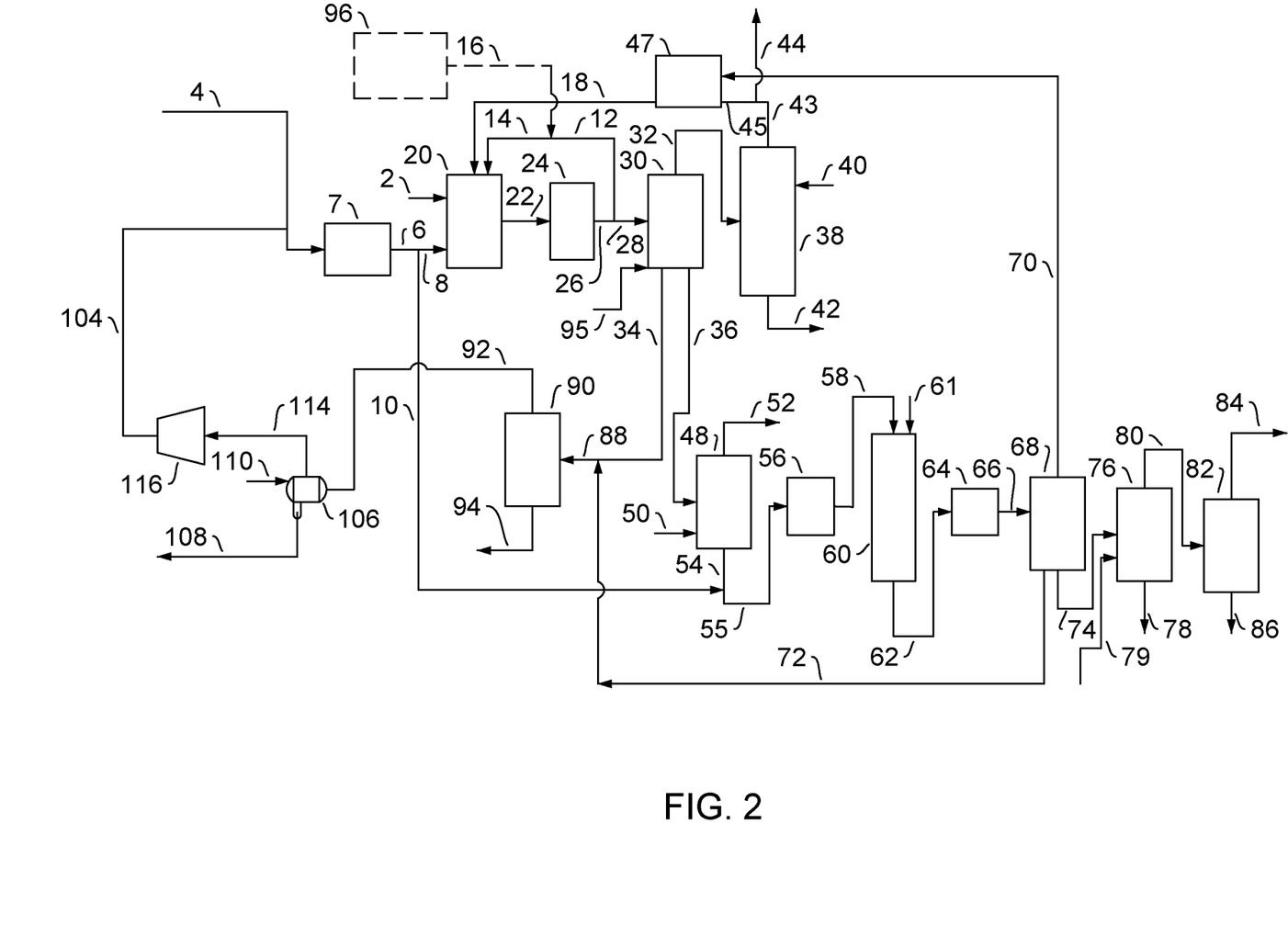
FIG. 2 is a block flow diagram of a renewable diesel plant with an amine unit and a sour gas recovery system.

Sour water stripper 90 may take as input sour water from stream 34 from phase separator 30 and sour water from stream 72 from separator 68 and or a combined stream 88 thereof. Stripping may be accomplished by reboiling water or as by providing a separate steam stream to sour water stripper 90. H2S and NH3 present in sour water stripper 90 may be stripped and removed from sour water stripper 90 in stream 92. Wastewater stream 94 containing a reduced amount of H2S as compared to stream 88 may be withdrawn from a bottom section of sour water stripper 90. The gas mixture in stream 92 is typically considered as a waste product of the process and is burned in a flare which contributes to nitrogen oxides (NOx) and sulfur oxides (SOx) emissions of the renewable diesel process FIG. 2 is a block flow diagram of a renewable diesel plant with an amine unit and a sour gas recovery system. The equipment in FIG. 2 is identical to those in FIG. 1 except the overhead stream, stream 92 of the sour water stripper 90 includes H2S, CO2, NH3 and water vapor. Stream 92 may be introduced into ammonia removal unit 106 where stream 92 is contacted with an aqueous acid stream 110. Ammonia removal unit 106 may include a vessel configured to contact acid and other fluids. Aqueous acid stream 110 may include a mineral acid such as H2SO4, for example, which may react with NH3 to form ammonium sulfate and may be withdrawn in stream 108. Aqueous acid stream 110 may include nitric acid whereby NH3 may react to form ammonium nitrate and may be withdrawn in stream 108. The acid concentration and contact time of the sour water may be tuned to reduce the content of ammonia in the sour water stripper overhead stream. For example, with sulfuric acid at pH 4, nearly 100% of the ammonia from the sour water stripper overhead stream will be converted to ammonium sulfate and H2S will pass through the aqueous acid. Treated gas stream 114 may be withdrawn from ammonia removal unit 106 and may include H2S, CO2 and water vapor. Treated gas stream 114 may be introduced into H2S compressor 116, the compressed H2S stream 104 may be mixed with makeup H2 stream 4 to the makeup hydrogen compressor 7. Alternatively, treated gas stream 114 may be introduced to makeup hydrogen compressor 7 without first compressing in H2S compressor 116. The hydrogen sulfide recovered from ammonia removal unit 106 in treated gas stream 114 may be used to reduce or eliminate the amount of sulfiding agent stream 16 required to be mixed with quench liquid hydrocarbon stream 14. Additionally, the captured sulfur reduces the amount of sulfur containing species which are sent to flare.

Figure 3:
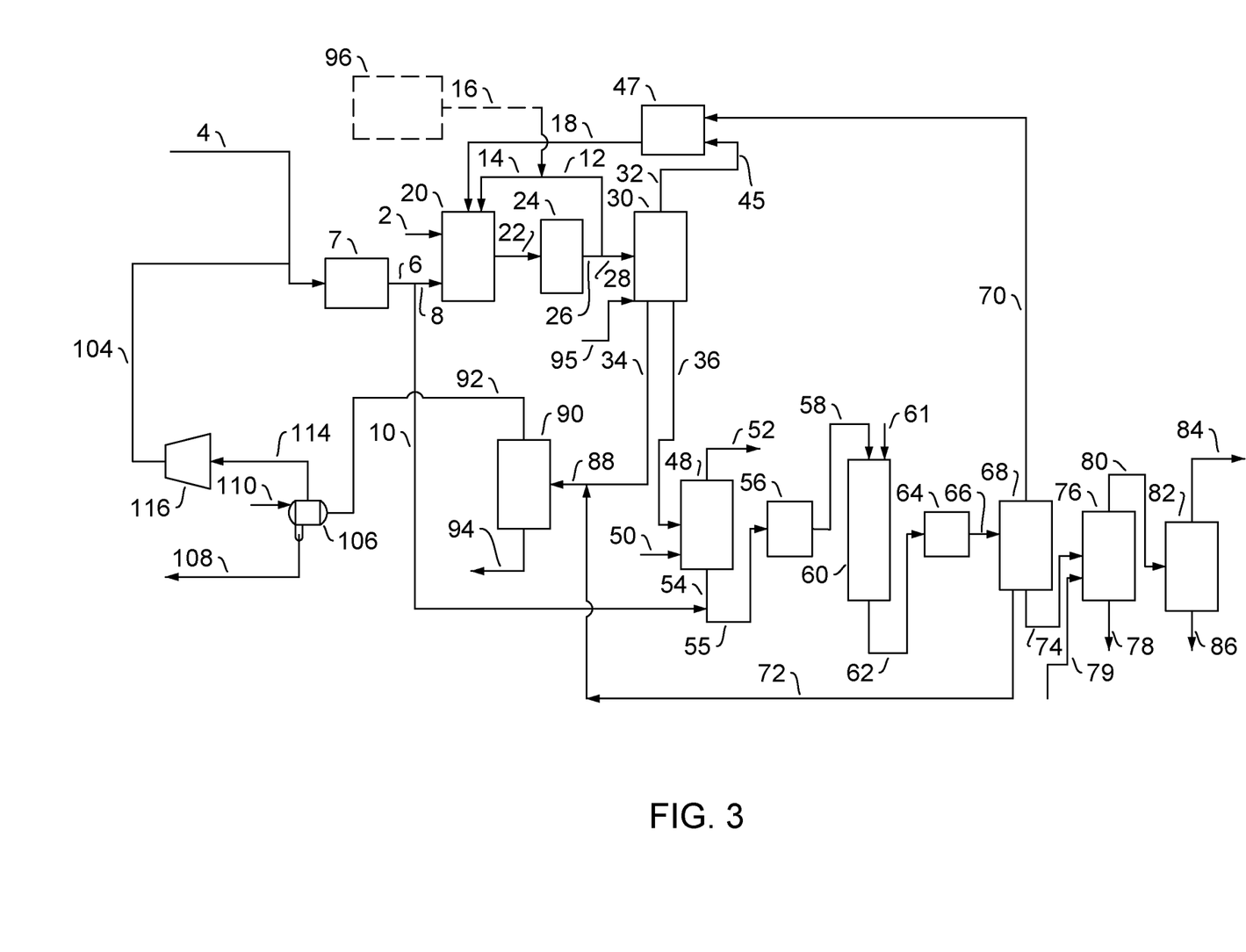
FIG. 3 is a block flow diagram of a renewable diesel plant without an amine unit and a sour gas recovery system

FIG. 3 is a block flow diagram of a renewable diesel plant without an amine unit and with a sour gas recovery system. As discussed above, catalyst choice for the hydroprocessing reactor may dictate the reactor effluent composition. In some examples, a catalyst may be selected which favors production of water over carbon dioxide. In such examples, an amine unit may not be required to reduce acid gas concentration in the hydrogen recycle steam. In FIG. 3, stream 32 from the phase separator 28 may include a large quantity of hydrogen which may be introduced back to recycle gas compressor 47. The equipment of FIG. 3 is identical to FIG. 2 except for the amine unit. As in FIG. 2, the overhead stream in stream 92 from sour water stripper 90 may be contacted with an aqueous acid stream 110 in ammonia removal unit 106 to react with ammonia in the overhead stream. Treated gas stream 114 may be introduced into H2S compressor 116, the compressed H2S stream 104 may be mixed with makeup H2 stream 4 to the makeup hydrogen compressor 7. Alternatively, treated gas stream 114 may be introduced to makeup hydrogen compressor 7 without first compressing in H2S compressor 116.

Figure 4:
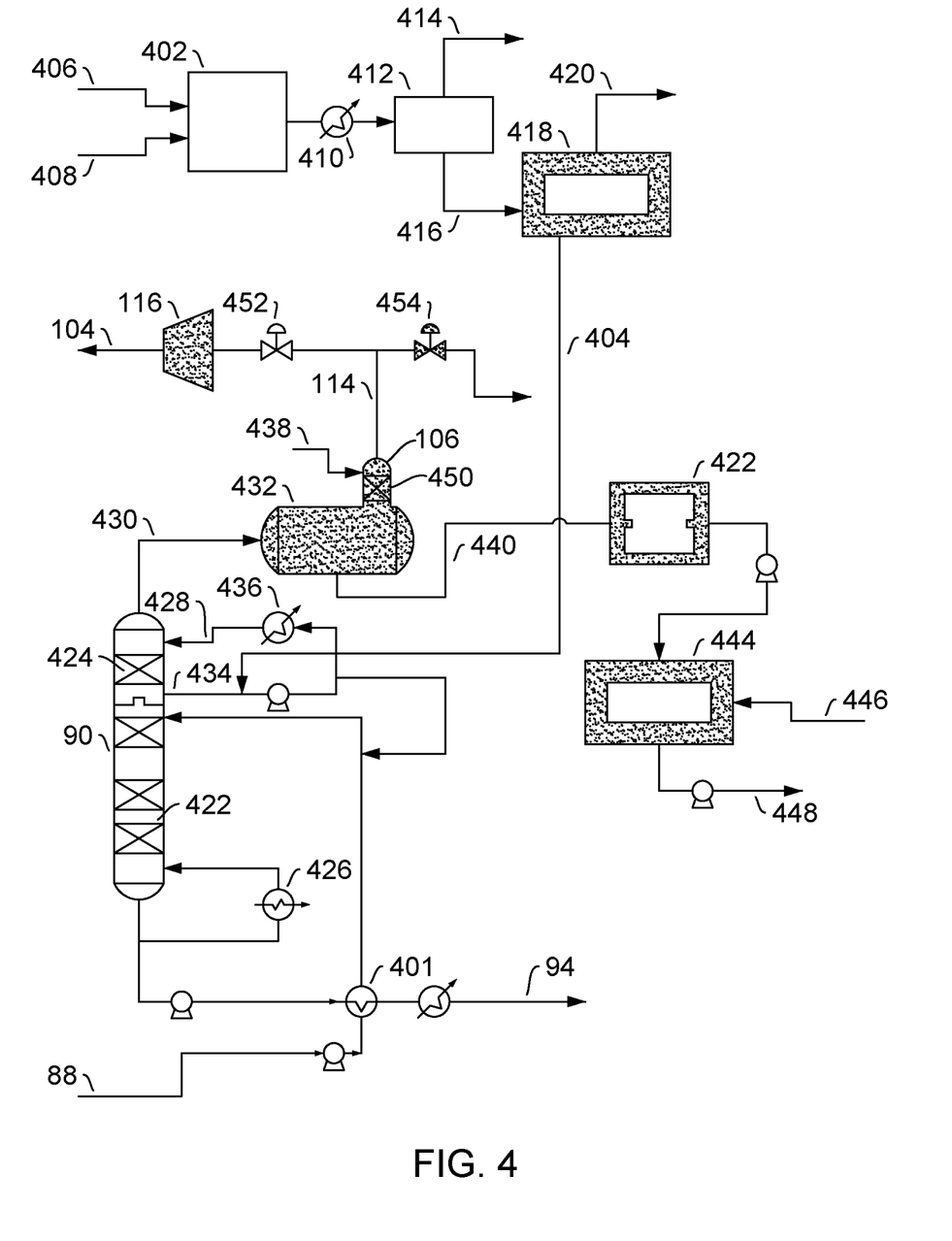
FIG. 4 is a block flow diagram of a sour gas recovery system.

FIG. 4 is a block flow diagram of a sour gas recovery system of FIG. 2 and FIG. 3. FIG. 4 includes the recovery of NH3 from both stream 88 from phase separator 30 and phase separator 68 as well as from reject water stream 404 from steam methane reformer 402. Natural gas stream 406 and steam stream 408 may be introduced into stream methane reformer 402. H2 is produced in the steam methane reformer 402. In steam methane reformer 402, natural gas from natural gas stream 406 and steam from steam stream 408 may be reacted to form an effluent containing H2, CO2, CO, H2O and trace NH3. The effluent from steam methane reformer 402 may be cooled in cooler 410 and thereafter may be introduced into phase separator 412. Phase separator 412 may separate the cooled effluent stream into a hydrogen rich stream 414 and condensate stream 416 containing water and NH3. Hydrogen rich stream 414 may be introduced into a pressure swing adsorption unit to further purify the hydrogen which may then be used in the processes described in FIGS. 1-3. In some examples, condensate stream 416 may be introduced into concentration unit 418 which may concentrate ammonia from condensate stream 416 to reject water stream 404 and generate a treated condensate stream 420 containing water with reduced ammonia concentration. Treated condensate stream 420 may be used as a boiler feedwater stream which may be suitable for generating steam. The balance of ammonia from condensate stream 416 may be disposed in reject water stream 404. Concentration unit 418 may be any suitable unit for concentrating ammonia such as an electrodialysis unit. Concentration unit 418 may concentrate a majority (greater than 50%) of the ammonia from condensate stream 416. Alternatively, condensate stream 416 may be directly routed to sour water stripper 90 without first being concentrated in a concentration unit. While only a simplified steam methane reformer unit is illustrated in FIG. 4, there may be many configurations for a steam methane reformer which produce a condensate stream containing water and ammonia. The process disclosed herein is applicable to any steam methane reformer which produce a condensate stream containing water and ammonia.

Sour water stripper 90 may include two sections, stripping section 422 and wash section 424. Stream 88 containing sour water and potentially ammonia from upstream processes may be heated in exchanger 401 by stream 94 before being introduced into stripping section 422 of sour water stripper 90. Stripping steam may be provided by reboiler 426 or may be separately introduced into stripping section 422 from a steam stream. The stripped gasses generated in stripping section 422 may enter wash section 424 whereby the stripped gasses may be contacted with wash water 428. An overhead stream 430 containing H2S and NH3 may be withdrawn from sour water stripper 90 and introduced into ammonia removal unit 106. Recirculating water stream 434 may be withdrawn from wash section 424, cooled in heat exchanger 436 and be re-introduced into wash section 424. In some embodiments, water stream 404 from steam methane reformer 402 may be combined with recirculating water stream 434 before or after introduction into heat exchanger 436. Still further, recirculating water stream 434 may be split and a portion of water stream 434 may be combined with stream 88 before entering stripping section 422.

Acidified wash water stream 438 having pH range 3 to 5 may be introduced into ammonia removal unit 106. Ammonia removal unit 106 may be configured to allow overhead stream 430 containing H2S and NH3 to contact acidified wash water stream 438 to absorb at least a portion of NH3 in overhead stream 430 with the acidified wash water. For example, ammonia removal unit 106 may include a packed section 450 that allows for intimate contact between NH3 gas and acidified wash water. The H2S may pass through the acidified wash water and be removed from ammonia removal drum as treated gas stream 114. As the NH3 and acidified wash water contact in packed section 450, the NH3 may dissolve and be absorbed in the acidified wash water. The acidified wash water may include any suitable acid, including, but not limited to hydrochloric acid, sulfuric acid, and nitric acid. The pH of acid stream 438 may be kept at a pH of about 3-5 to ensure high absorption of the NH3. The aqueous NH3 solution may be withdrawn from ammonia removal unit 106 as stream 440. Stream 440 may be routed to holding tank 442 and thereafter to neutralizing unit 444 where the solution of water, dissolved ammonia, and reaction product form ammonia removal unit 106 may be further contacted with a dilute acid stream 446 to neutralize any remaining ammonia. Dilute acid stream 446 may contain an aqueous acid solution which may be the same or a different acid used in the ammonia removal unit 106. A product stream 448 may be withdrawn from neutralizing unit 444 which contains water and reaction product form ammonia removal drum. In some embodiments, product stream 448 may include an aqueous solution of ammonium sulfate or ammonium nitrate.

Treated gas stream 114 from ammonia removal unit 106 may contain H2S, CO2, and water. In some embodiments, the water content may be reduced by drying treated gas stream 114 in a drying unit or other unit operation to remove at least a portion of the water. As illustrated in FIG. 4, treated gas stream 114 may be introduced into an inlet of H2S compressor 116 through valve 452. H2S compressor 116 may compress treated gas stream 114 such that compressed H2S stream 104 may be mixed with makeup H2 stream 4 before introducing the mixed H2/H2S into makeup hydrogen compressor 7 as shown in FIGS. 2 and 3. Valve 452 may be normally open to allow for treated gas stream 114 to be reused as a sulfiding agent. Valve 454 may be provided to redirect treated gas stream 114 to flare incinerate H2S and/or NH3.

Statement 1. A method comprising: introducing triglycerides, hydrogen, and a sulfiding agent into a hydroprocessing reactor; reacting the triglycerides with the hydrogen in the hydroprocessing reactor to form at least paraffins; separating at least a portion of a hydroprocessing reactor effluent from the hydroprocessing reactor in a first phase separator to produce a first sour water stream comprising water and a first quantity of hydrogen sulfide and a paraffin stream comprising at least a portion of the paraffins; introducing the first sour water stream into a sour water stripper and stripping the first sour water stream to form a gaseous stream comprising at least a portion of the first quantity of the hydrogen sulfide from the first sour water stream; and contacting the gaseous stream with an acidified wash water. in an ammonia removal unit to produce a treated hydrogen sulfide stream; and introducing the treated hydrogen sulfide stream into the hydroprocessing reactor.

Statement 2. The method of statement 1, further comprising: separating another portion of the hydroprocessing reactor effluent to form a quench liquid hydrocarbon stream; mixing the quench liquid hydrocarbon stream with the sulfiding agent; and introducing the quench liquid hydrocarbon stream into the hydroprocessing reactor.

Statement 3. The method of any of statements 1-2, further comprising: introducing the paraffin stream into an isomerization reactor to form at least iso-paraffins; separating an isomerized reactor effluent from the isomerization reactor in a second phase separator to produce at least a second sour water stream comprising a second quantity of hydrogen sulfide; and introducing the second sour water stream into the sour water stripper, wherein the gaseous stream further comprises at least a portion of the second quantity of the hydrogen sulfide.

Statement 4. The method of statement 3, further comprising introducing at least a portion of the treated hydrogen sulfide stream into the isomerization reactor.

Statement 5. The method of any of statements 1-4, wherein the hydroprocessing reactor effluent further comprises ammonia and wherein the first sour water stream further comprises at least a portion of the ammonia from the hydroprocessing reactor effluent.

Statement 6. The method of statement 5, wherein at least a portion of the ammonia is absorbed in the acidified wash water. when contacted in the ammonia removal unit, to form an aqueous ammonia solution product.

Statement 7. The method of statement 6, wherein the aqueous ammonia solution is kept in a tank.

Statement 8. The method of statement 7, wherein the aqueous ammonia solution is neutralized with sulfuric acid and form a reaction product comprises ammonium sulfate.

Statement 9. The method of statement 6, wherein the ammonia removal unit comprises a packed section, wherein the at least a portion of the ammonia and the acidified wash water are introduced into the packed section, and wherein the ammonia containing stream and the acidified wash water are contacted in the packed section.

Statement 10. The method of any of statements 1-9, wherein the hydroprocessing reactor comprises a plurality of catalyst beds wherein the plurality of catalyst beds are configured to perform olefin saturation, demetalization, and deoxygenation reactions successively.

Statement 11. A method comprising: introducing a natural gas stream comprising methane and a steam stream into a steam methane reformer; reacting methane with the steam in the steam methane reformer to form a steam methane reformer effluent comprising hydrogen, carbon dioxide, ammonia, and water; separating a least a portion of the ammonia and water from the steam methane reformer effluent to form an ammonia-water condensate stream; introducing the ammonia-water condensate stream into an electrodialysis unit to generate a concentrated ammonia; introducing the concentrated ammonia stream into a sour water stripper; introducing triglycerides, at least a portion of the hydrogen from the steam methane reformer effluent, and a sulfiding agent into a hydroprocessing reactor, reacting the triglycerides with the at least a portion of the hydrogen from the steam methane reformer effluent in the hydroprocessing reactor to form at least paraffins; separating the reactor effluent in a first phase separator to produce a first sour water stream comprising water and a first quantity of hydrogen sulfide and a paraffin stream comprising at least a portion of the paraffins; introducing the first sour water stream into the sour water stripper; stripping the first sour water stream and the concentrated ammonia stream in the sour water stripper to form a gaseous stream comprising at least a portion of the first quantity of the hydrogen sulfide from the first sour water stream and ammonia from the concentrated ammonia stream; and contacting the gaseous stream with acidified wash water in an ammonia removal unit to produce a treated hydrogen sulfide stream, wherein the ammonia in the gaseous stream get absorbed in the acidified wash water to produce an aqueous ammonia solution product; and introducing the treated hydrogen sulfide stream into the hydroprocessing reactor.

Statement 12. The method of statement 11, wherein the aqueous ammonia solution is neutralized by nitric acid and the ammonia reaction product comprises ammonium nitrate.

Statement 13. The method of any of statements 11-12, wherein the aqueous ammonia solution is neutralized by sulfuric acid and the ammonia reaction product comprises ammonium sulfate.

Statement 14. The method of any of statements 11-13, wherein the ammonia removal unit comprises a packed section, wherein the gaseous stream and acidified wash water are introduced into the packed section, and wherein the gaseous stream and the acidified wash water are contacted in the packed section.

Statement 15. The method of any of statements 11-14, further comprising: introducing the paraffin stream into an isomerization reactor to form at least iso-paraffins; separating an isomerized reactor effluent from the isomerization reactor in a second phase separator to produce at least a second sour water stream comprising a second quantity of hydrogen sulfide; and introducing the second sour water stream into the sour water stripper, wherein the gaseous stream further comprises at least a portion of the hydrogen sulfide.

Statement 16. The method of statement 15, further comprising introducing the treated hydrogen sulfide stream into the isomerization reactor.

Statement 17. The method of any of statements 11-15, wherein the hydroprocessing reactor comprises a plurality of catalyst beds wherein the plurality of catalyst beds are configured to perform olefin saturation, demetalization, and deoxygenation reactions successively.

Statement 18. A system comprising: a hydroprocessing reactor, wherein the hydroprocessing reactor is operable to react the triglycerides and hydrogen at conditions to convert the triglycerides to paraffins; a phase separator fluidically coupled to the hydroprocessing reactor to receive a hydroprocessing reactor effluent; a sour water stripper fluidically coupled to the phase separator to receive a sour water stream from the phase separator, wherein the sour water stripper is operable to strip the sour water stream; and an ammonia removal unit fluidically coupled to the sour water stripper and the hydroprocessing reactor, wherein the ammonia removal unit is operable to contact a gaseous stream from the sour water stripper with an acidified wash water to produce a treated hydrogen sulfide stream for recycle to the hydroprocessing reactor.

Statement 19. The system of statement 18, further comprising: an isomerization reactor fluidically coupled to the phase separator, wherein the isomerization reactor is operable to isomerize at least a portion of the paraffins to form iso-paraffins; and a second phase separator fluidically coupled to the isomerization reactor and the sour water stripper, wherein the second phase separator is operable to produce a second sour water stream for delivery to the sour water stripper.

Statement 20. The system of statements 18-19, further comprising: a steam methane reforming unit that is operable to react natural gas with steam to output a reactor effluent comprising hydrogen, carbon dioxide, ammonia, and water; a separation unit fluidically coupled to the steam methane reformer to receive the reactor effluent, wherein the separation unit is operable to separate at least a portion of the water and the ammonia; and an electrodialysis unit fluidically coupled to the separation unit and the sour water stripper, wherein the electrodialysis unit is operable to concentrate the ammonia to form a concentrated ammonia stream for delivery to the sour water stripper.

It is to be understood that the present disclosure is not limited to particular devices or methods, which may, of course, vary. It is also to be understood that the terminology used herein is for the purpose of describing particular embodiments only and is not intended to be limiting. All numbers and ranges disclosed herein may vary by some amount. Whenever a numerical range with a lower limit and an upper limit is disclosed, any number and any included range falling within the range are specifically disclosed. Although individual embodiments are discussed herein, the invention covers all combinations of all those embodiments. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. If there is any conflict in the usages of a word or term in this specification and one or more patent or other documents that may be incorporated herein by reference, the definitions that are consistent with this specification should be adopted for the purposes of understanding this invention.

To facilitate a better understanding of the present invention, the following examples of certain aspects of some embodiments are given. In no way should the following examples be read to limit, or define, the entire scope of the disclosure.

EXAMPLES

In the following examples, the feed basis in Table 1 was used to calculate the NOx and SOx emissions for various scenarios of renewable diesel (RD) production in a renewable diesel unit (RDU).

TABLE 1

| RD product in RDU | BPD | 10,000 |
| Treated Feedstock Rate | BPD | 10,800 |
| Feedstock Specific Gravity | | 0.92 |
| Feedstock Rate | lb/h | 105533 |

Example 1

In this example, computer models of a renewable diesel unit were utilized to simulate the output of units within renewable diesel unit using the feed from Table 1. The simulation was performed where hydrogen sulfide from an amine stripper overhead stream and hydrogen sulfide from a sour water stripper overhead stream are incinerated by flaring. The results of the simulation are shown in Table 2. The units of ST/y refer to the standard ton, equivalent to 2,000 pounds mass.

TABLE 2

| S content in feedstock | wppm | 20 | 30 | 50 |
| --- | --- | --- | --- | --- |
| S content in feedstock | lb/h | 2.11 | 3.17 | 5.28 |
| H2S generated from feedstock | lb/h | 2.24 | 3.36 | 5.61 |
| Rate of DMDS added | lb/h | 20.17 | 18.6 | 15.45 |
| H2S generated from DMDS | lb/h | 14.36 | 13.24 | 11 |
| total H2S out of hydroprocessing reactor | lb/h | 16.61 | 16.61 | 16.61 |
| % H2S in hydroprocessing reactor effluent to Sour Water Stripper | % | 55 | 55 | 55 |
| % H2S in hydroprocessing reactor effluent to Amine Stripper | % | 45 | 45 | 45 |
| H2S in Feed to Sour Water Stripper | lb/h | 9.13 | 9.13 | 9.13 |
| H2S in Amine Regen Overhead | lb/h | 7.47 | 7.47 | 7.47 |
| Net H2O in Water Stripper Bottoms | lb/h | 13000 | 13000 | 13000 |
| H2S in Sour Water Stripper Bottoms | wppm | 10 | 10 | 10 |
| Rate of H2S in Sour Water Stripper Bottoms | lb/h | 0.13 | 0.13 | 0.13 |
| Rate of H2S in Sour Water Stripper Overhead | lb/h | 9 | 9 | 9 |
| SOx generated in Sour Water Stripper Overhead if incinerated | lb/h | 16.9 | 16.9 | 16.9 |
| SOx generated in Sour Water Stripper Overhead if incinerated | ST/y | 74 | 74 | 74 |
| SOx generated from amine regen Overhead if incinerated | lb/h | 14.07 | 14.07 | 14.07 |
| SOx generated from amine regen Overhead if incinerated | ST/y | 62 | 62 | 62 |
| Total SOx generated in renewable diesel unit if all H2S incinerated | ST/y | 136 | 136 | 136 |
| Rate of DMDS added | ST/y | 88 | 81 | 68 |

Example 2

In this example, computer simulations were performed where hydrogen sulfide from an amine stripper overhead stream was incinerated by flaring and hydrogen sulfide from a sour water overhead stream was recycled. The results of the simulation are shown in Table 3.

TABLE 3

| S content in feedstock | wPPm | 20 | 30 | 50 |
|---|---|---|---|---|
| S content in feedstock | lb/h | 2.11 | 3.17 | 5.28 |
| H2S generated from feedstock | lb/h | 2.24 | 3.36 | 5.61 |
| Rate of DMDS added | lb/h | 7.53 | 5.96 | 2.81 |
| S in added DMDS | lb/h | 5.05 | 3.99 | 1.89 |
| H2S generated from DMDS | lb/h | 5.36 | 4.24 | 2 |
| H2S recycled from Sour Water Stripper Overhead | lb/h | 9 | 9 | 9 |
| total H2S out of hydroprocessing reactor | lb/h | 16.61 | 16.61 | 16.61 |
| % H2S in hydroprocessing reactor effluent to Sour Water Stripper | % | 55 | 55 | 55 |
| % H2S in hydroprocessing reactor effluent to Amine Stripper | % | 45 | 45 | 45 |
| H2S in Feed to Sour Water Stripper | lb/h | 9.13 | 9.13 | 9.14 |
| H2S in Amine Regen Overhead | lb/h | 7.47 | 7.47 | 7.47 |
| Net H2O in Sour Water Stripper Bottoms | lb/h | 13000 | 13000 | 13000 |
| H2S in Sour Water Stripper Bottoms | wPPm | 10 | 10 | 10 |
| Rate of H2S in Sour Water Stripper Bottoms | lb/h | 0.13 | 0.13 | 0.13 |
| Rate of H2S in Sour Water Stripper Overhead | lb/h | 0 | 0 | 0 |
| SOx generated if H2S Sour Water Stripper Overhead recycled | lb/h | 0 | 0 | 0 |
| SOx generated if H2S Sour Water Stripper Overhead recycled | ST/y | 0 | 0 | 0 |
| SOx generated from amine regen Overhead if incinerated | lb/h | 14.07 | 14.07 | 14.07 |
| SOx generated from amine regen Overhead if incinerated | ST/y | 62 | 62 | 62 |
| Total SOx generated renewable diesel unit if all H2S incinerated | ST/y | 62 | 62 | 62 |
| Rate of DMDS added | ST/y | 33 | 26 | 12 |

Example 3

In this example, computer simulations were performed where ammonia from an amine stripper overhead stream and ammonia from a sour water stripper overhead stream were incinerated by flaring. The results of the simulation are shown in Table 4.

TABLE 4

| N content in pretreated feedstock | wPPm | 20 | 100 | 300 |
|---|---|---|---|---|
| NH3 out of the hydroprocessing reactor | lb/h | 2.11 | 10.55 | 31.66 |
| % NH3 in hydroprocessing reactor effluent to Sour Water Stripper | % | 75 | 75 | 75 |
| % NH3 in hydroprocessing reactor effluent to Amine Stripper | % | 25 | 25 | 25 |
| NH3 in Feed to Sour Water Stripper | lb/h | 1.58 | 7.92 | 23.75 |
| NH3 in Amine Regen Overhead | lb/h | 0.53 | 2.64 | 7.92 |
| NH3 in Sour Water Stripper Bottoms | wPPm | 5 | 5 | 5 |
| Rate of NH3 in Sour Water Stripper Bottoms | lb/h | 0.065 | 0.065 | 0.065 |
| Rate of NH3 in Sour Water Stripper Overhead | lb/h | 1.52 | 7.85 | 23.68 |
| NOx generated in Sour Water Stripper Overhead if incinerated | lb/h | 3.9 | 20.3 | 61.3 |
| NOx generated in Sour Water Stripper Overhead if incinerated | ST/y | 17 | 89 | 268 |
| NOx generated from amine regen Overhead if incinerated | lb/h | 1.37 | 6.83 | 20.49 |
| NOx generated from amine regen Overhead if incinerated | ST/y | 6 | 30 | 90 |
| Total NOx generated in renewable diesel unit if all NH3 incinerated | ST/y | 23 | 119 | 358 |

Example 4

In this example, computer simulations were performed where ammonia from an amine stripper overhead stream was incinerated by flaring and ammonia from a sour water stripper overhead stream was recovered in an ammonia removal unit as in FIGS. 2-4 absorbed under acidic conditions with sulfuric acid. The results of the simulation are shown in Table 5.

TABLE 5

| N content in pretreated feedstock | wppm | 20 | 100 | 300 |
|---|---|---|---|---|
| NH3 out of the hydroprocessing reactor | lb/h | 2.11 | 10.55 | 31.66 |
| % NH3 in hydroprocessing reactor effluent to Sour Water Stripper | % | 75 | 75 | 75 |
| % NH3 in hydroprocessing reactor effluent to Amine Stripper | % | 25 | 25 | 25 |
| NH3 in Feed to Sour Water Stripper | lb/h | 1.58 | 7.92 | 23.75 |
| NH3 in Amine Regen Overhead | lb/h | 0.53 | 2.64 | 7.92 |
| Net H2O in Sour Water Stripper Bottoms | lb/h | 13000 | 13000 | 13000 |
| NH3 in Sour Water Stripper Bottoms | wppm | 5 | 5 | 5 |
| Rate of NH3 in Sour Water Stripper Bottoms | lb/h | 0.065 | 0.065 | 0.065 |
| Rate of NH3 in Sour Water Stripper Overhead | lb/h | 1.52 | 7.85 | 23.68 |
| NOx generated if NH3 Sour Water Stripper Overhead is Acidified | lb/h | 0 | 0 | 0 |
| NOx generated if NH3 Sour Water Stripper Overhead is Acidified | ST/y | 0 | 0 | 0 |
| NOx generated from amine regen Overhead if incinerated | lb/h | 1.37 | 6.83 | 20.49 |
| NOx generated from amine regen Overhead if incinerated | ST/y | 6 | 30 | 90 |
| Total NOx generated in renewable diesel unit if all NH3 incinerated | ST/y | 6 | 30 | 90 |
| (NH4)2SO4 produced | lb/h | 5.28 | 11.61 | 27.44 |
| (NH4)2SO4 produced | ST/y | 23 | 51 | 120 |

Results

A comparison of Example 1 and Example 2 of hydrogen sulfide incineration and recycling of the hydrogen sulfide in the overhead sour water stream is shown in Table 6. It was observed that the SOx emissions were reduced and significantly less sulfiding agent was required.

TABLE 6

|  |  | $H_2S$ Incinerated | | | $H_2S$ Recycled | | |
| --- | --- | --- | --- | --- | --- | --- | --- |
| S in triglyceride Feed | wppm | 20 | 30 | 90 | 20 | 30 | 90 |
| Amine Stripper SOx | ST/y | 62 | 62 | 62 | 62 | 62 | 62 |
| Sour Water Stripper Overhead SOx | ST/y | 74 | 74 | 74 | 0 | 0 | 0 |
| Renewable diesel unit Total SOx | ST/y | 136 | 136 | 136 | 62 | 62 | 62 |
| DMDS Added | ST/y | 88 | 81 | 61 | 33 | 26 | 12 |
| DMDS Saving by Recycling $H_2S$ | ST/y |  |  |  | 55 | 55 | 49 |

A comparison of Example 3 and Example 4 of ammonia incineration and recycling of the ammonia in the overhead sour water stream is shown in Table 7. It was observed that the NOx emissions reduced and ammonium sulfate product was successfully produced.

TABLE 7

|  |  | $NH_3$ Incinerated | | | $NH_3$ Absorbed in Acidified Water | | |
| --- | --- | --- | --- | --- | --- | --- | --- |
| N in triglyceride Feed | wppm | 20 | 100 | 300 | 20 | 100 | 300 |
| Amine Stripper NOx | ST/y | 6 | 30 | 90 | 6 | 30 | 90 |
| Sour Water Stripper Overhead NOx | ST/y | 17 | 89 | 286 | 0 | 0 | 0 |
| renewable diesel Total NOx | ST/y | 23 | 119 | 376 | 6 | 30 | 90 |
| Ammonium Sulfate Produced | ST/y | 0 | 0 | 0 | 23 | 51 | 120 |

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all the problems addressed herein. Various advantages of the present disclosure have been described herein, but embodiments may provide some, all, or none of such advantages, or may provide other advantages.

What is claimed is:

1. A method comprising:
introducing triglycerides, hydrogen, and a sulfiding agent into a hydroprocessing reactor;
reacting the triglycerides with the hydrogen in the hydroprocessing reactor to form at least paraffins;
separating at least a portion of a hydroprocessing reactor effluent from the hydroprocessing reactor in a first phase separator to produce a first sour water stream comprising water and a first quantity of hydrogen sulfide and a paraffin stream comprising at least a portion of the paraffins;
introducing the first sour water stream into a sour water stripper and stripping the first sour water stream to form a gaseous stream comprising at least a portion of the first quantity of the hydrogen sulfide from the first sour water stream; and
contacting the gaseous stream with acidified wash water in an ammonia removal unit to produce a treated hydrogen sulfide stream; and
introducing the treated hydrogen sulfide stream into the hydroprocessing reactor.

2. The method of claim 1, further comprising:
separating another portion of the hydroprocessing reactor effluent to form a quench liquid hydrocarbon stream;
mixing the quench liquid hydrocarbon stream with the sulfiding agent; and
introducing the quench liquid hydrocarbon stream into the hydroprocessing reactor.

3. The method of claim 1, further comprising:
introducing the paraffin stream into an isomerization reactor to form at least iso-paraffins;
separating an isomerized reactor effluent from the isomerization reactor in a second phase separator to produce at least a second sour water stream comprising a second quantity of hydrogen sulfide; and
introducing the second sour water stream into the sour water stripper, wherein the gaseous stream further comprises at least a portion of the second quantity of the hydrogen sulfide.

4. The method of claim 3, further comprising introducing at least a portion of the treated hydrogen sulfide stream into the isomerization reactor.

5. The method of claim 1, wherein the hydroprocessing reactor effluent further comprises ammonia and wherein the first sour water stream further comprises at least a portion of the ammonia from the hydroprocessing reactor effluent.

6. The method of claim 5, wherein at least a portion of the ammonia and the acidified wash water are contacted in the ammonia removal unit, wherein the at least a portion of the ammonia is absorbed in the acidified wash water to form an aqueous ammonia solution product.

7. The method of claim 6, wherein the aqueous ammonia solution is neutralized with nitric acid and forms a reaction product comprises ammonium nitrate.

8. The method of claim 6, wherein the aqueous ammonia solution is neutralized with sulfuric acid and form a reaction product comprises ammonium sulfate.

9. The method of claim 6, wherein the ammonia removal unit comprises a packed section, wherein the at least a portion of the ammonia and the acidified wash water are introduced into the packed section, and wherein the at least a portion of the ammonia and the acidified wash water are contacted in the packed section.

10. The method of claim 1, wherein the hydroprocessing reactor comprises a plurality of catalyst beds wherein the plurality of catalyst beds are configured to perform olefin saturation, demetalization, and deoxygenation reactions successively.

11. A method comprising:
   introducing a natural gas stream comprising methane and a steam stream into a steam methane reformer;
   reacting methane with the steam in the steam methane reformer to form a steam methane reformer effluent comprising hydrogen, carbon dioxide, ammonia, and water;
   separating a least a portion of the ammonia and water from the steam methane reformer effluent to form an ammonia-water condensate stream;
   introducing the ammonia-water condensate stream into an electrodialysis unit to generate a concentrated ammonia;
   introducing the concentrated ammonia stream into a sour water stripper;
   introducing triglycerides, at least a portion of the hydrogen from the steam methane reformer effluent, and a sulfiding agent into a hydroprocessing reactor,
   reacting the triglycerides with the at least a portion of the hydrogen from the steam methane reformer effluent in the hydroprocessing reactor to form at least paraffins;
   separating the reactor effluent in a first phase separator to produce a first sour water stream comprising water and a first quantity of hydrogen sulfide and a paraffin stream comprising at least a portion of the paraffins;
   introducing the first sour water stream into the sour water stripper;
   stripping the first sour water stream and the concentrated ammonia stream in the sour water stripper to form a gaseous stream comprising at least a portion of the first quantity of the hydrogen sulfide from the first sour water stream and ammonia from the concentrated ammonia stream; and
   contacting the gaseous stream with an acidified wash water in an ammonia removal unit to produce a treated hydrogen sulfide stream, wherein the ammonia in the gaseous stream get absorbed in the acidified wash water to produce an aqueous ammonia solution product; and
   introducing the treated hydrogen sulfide stream into the hydroprocessing reactor.

12. The method of claim 11, wherein the aqueous ammonia solution is neutralized with nitric acid and form ammonia reaction product comprises ammonium nitrate.

13. The method of claim 11, wherein the aqueous ammonia solution is neutralized with sulfuric acid and form ammonia reaction product comprises ammonium sulfate.

14. The method of claim 11, wherein the ammonia removal unit comprises a packed section, wherein the gaseous stream and acidified wash water are introduced into the packed section, and wherein the gaseous stream and the aqueous acid are contacted in the packed section.

15. The method of claim 11, further comprising:
   introducing the paraffin stream into an isomerization reactor to form at least iso-paraffins;
   separating an isomerized reactor effluent from the isomerization reactor in a second phase separator to produce at least a second sour water stream comprising a second quantity of hydrogen sulfide; and
   introducing the second sour water stream into the sour water stripper, wherein the gaseous stream further comprises at least a portion of the hydrogen sulfide.

16. The method of claim 15, further comprising introducing the treated hydrogen sulfide stream into the isomerization reactor.

17. The method of claim 11, wherein the hydroprocessing reactor comprises a plurality of catalyst beds wherein the plurality of catalyst beds are configured to perform olefin saturation, demetalization, and deoxygenation reactions successively.

18. A system comprising:
   a hydroprocessing reactor, wherein the hydroprocessing reactor is operable to react the triglycerides and hydrogen at conditions to convert the triglycerides to paraffins;
   a phase separator fluidically coupled to the hydroprocessing reactor to receive a hydroprocessing reactor effluent;
   a sour water stripper fluidically coupled to the phase separator to receive a sour water stream from the phase separator, wherein the sour water stripper is operable to strip the sour water stream; and
   an ammonia removal unit fluidically coupled to the sour water stripper and the hydroprocessing reactor, wherein the ammonia removal unit is operable to contact a gaseous stream from the sour water stripper with an acidified wash water to produce a treated hydrogen sulfide stream for recycle to the hydroprocessing reactor.

19. The system of claim 18, further comprising:
   an isomerization reactor fluidically coupled to the phase separator, wherein the isomerization reactor is operable to isomerize at least a portion of the paraffins to form iso-paraffins; and
   a second phase separator fluidically coupled to the isomerization reactor and the sour water stripper, wherein the second phase separator is operable to produce a second sour water stream for delivery to the sour water stripper.

20. The system of claim 18, further comprising:
   a steam methane reforming unit that is operable to react natural gas with steam to output a reactor effluent comprising hydrogen, carbon dioxide, ammonia, and water;
   a separation unit fluidically coupled to the steam methane reformer to receive the reactor effluent, wherein the separation unit is operable to separate at least a portion of the water and the ammonia; and
   an electrodialysis unit fluidically coupled to the separation unit and the sour water stripper, wherein the electrodialysis unit is operable to concentrate the ammonia to form a concentrated ammonia stream for delivery to the sour water stripper.

* * * * *